(12) United States Patent
Herdin et al.

(10) Patent No.: US 7,231,897 B2
(45) Date of Patent: Jun. 19, 2007

(54) COMBUSTION ENGINE

(75) Inventors: Günther Herdin, Jenbach (AT); Johann Klausner, St. Jakob i.H. (AT)

(73) Assignee: GE Jenbacher GmbH & Co OHG, Jenbach (AT)

(*) Notice: Subject to any disclaimer, the term of this patent is extended or adjusted under 35 U.S.C. 154(b) by 2 days.

(21) Appl. No.: 10/759,768

(22) Filed: Jan. 16, 2004

(65) Prior Publication Data

US 2004/0216712 A1 Nov. 4, 2004

(30) Foreign Application Priority Data

Jan. 16, 2003 (AT) .................................. A 54/2003

(51) Int. Cl.
*F02P 23/04* (2006.01)

(52) U.S. Cl. .............................. 123/143 B; 123/143 A; 73/356

(58) Field of Classification Search ............ 123/143 A, 123/143 B, 143 R, 1 R, 527; 73/356
See application file for complete search history.

(56) References Cited

U.S. PATENT DOCUMENTS

| 4,523,552 A | * | 6/1985 | Mukainakano et al. . | 123/143 B |
| 4,620,512 A | * | 11/1986 | Brooks et al. .......... | 123/145 A |
| 5,328,665 A | * | 7/1994 | Geiger ..................... | 422/105 |

FOREIGN PATENT DOCUMENTS

| DE | 199 42 064 A1 | 3/2001 |
| EP | 1 063 427 | 12/2000 |
| EP | 1 253 316 | 10/2002 |
| EP | 1 329 631 | 7/2003 |
| JP | 10-196508 | 7/1998 |
| JP | 2001073775 A | 3/2001 |
| WO | 02/095220 | 11/2002 |

OTHER PUBLICATIONS

Morsy, M.H. and Chung S.H., "Laser-induced multi-point ignition with a single-shot laser using two conical cavities for hydrogen/air mixtures," Experimental Thermal and Fluid Science, vol. 27, Issue 4, Apr. 2003, pp. 491-497.

* cited by examiner

*Primary Examiner*—Stephen K. Cronin
*Assistant Examiner*—Johnny H. Hoang
(74) *Attorney, Agent, or Firm*—Wenderoth, Lind & Ponack, L.L.P.

(57) ABSTRACT

Internal combustion engine with at least one cylinder, in which a fuel/air mixture can be compressed in a cylinder by a piston, the temperature of the fuel/air mixture in the combustion chamber being able to be brought at least to over roughly 80% and up to at most roughly 98% of the spontaneous ignition temperature of the fuel/air mixture and the ignition of the combustion being time-controlled through the introduction of laser light into the combustion chamber.

41 Claims, 4 Drawing Sheets

COMBUSTION ENGINE

BACKGROUND

The present invention relates to an internal combustion engine with at least one cylinder, in which a fuel/air mixture can be compressed in the cylinder by a piston.

The constant increase in the use of such internal combustion engines in motor vehicles and for the generation of electric energy has, because of the limited quantities of fossil fuels which form the basis for the preparation of engine fuels, and because of new government legislation limiting the emission of harmful exhaust gases, driven forward the search for new highly efficient combustion concepts, low in pollutants, for such engines.

The HCCI concept (homogeneous compressed charge ignition) may be named here by way of example, in which the ignition of an extremely lean and homogeneous fuel/air mixture is brought about by increasing the temperature during the compression process close to the top dead centre of the piston. With the HCCI concept, the features of conventional combustion concepts are combined in a very advantageous way, since for example, as with Otto engine, a homogeneous fuel/air mixture is used which minimizes particle formation (soot) during the combustion process and, as with the diesel engine, a spontaneous ignition of the fuel/air mixture takes place, whereby a high thermodynamic efficiency results. The use of a lean fuel/air mixture permits its combustion with extremely low nitrogen oxide ($NO_x$) levels.

The spontaneous ignition of the fuel/air mixture in the combustion chamber is mostly achieved by a combination of different measures, such as for example a high geometric compression ratio $\epsilon$ and the pre-heating of the cylinder charge through suitable measures (air preheating or recycling of exhaust gas). Since, with this combustion concept, the fuel/air mixture ignites volumetrically more or less simultaneously in the whole cylinder volume, combustion occurs extremely quickly. Moreover, since no flame propagation is required, unlike what happens in Otto engines, such a HCCI engine can be operated with a high air/fuel ratio $\lambda$.

A problem with this state of the art is the actual ignition point, which has to be almost exactly the same as the ignition moment at which the piston reaches its top dead centre. Unlike what happens with Otto or diesel engines (ignition by spark plugs or injection) it is precisely this ignition point that cannot be controlled externally in the case of a HCCI engine. This problem prevents the wide use of HCCI engine technology its advantages consequently remaining unused.

SUMMARY

The object of the invention is to create an internal combustion engine according to the precharacterizing clause which allows low-pollutant operation.

This is achieved according to the invention in that the temperature (in Kelvin, K) of the fuel/air mixture in the combustion chamber can be brought at least to over roughly 80% and up to at most roughly 98% of the spontaneous ignition temperature (in Kelvin, K) of the fuel/air mixture and the ignition of the combustion is time-controlled through the introduction of laser light into the combustion chamber. The setting of the difference between the temperature of the fuel/air mixture and the spontaneous ignition temperature can for example (according to the air/fuel ratio $\lambda$ and the chosen fuel) take place through the choice of the geometric compression ratio $\epsilon$, known measures for preheating the fuel/air mixture and similar measures known to a person skilled in the art.

It is technically advantageous that, with a time-based, externally ignited combustion engine, similar to what happens with the HCCI concept, the pointwise introduction of the laser light energy leads to the establishment of a shock front, which triggers the quasi-volumetric combustion (in the manner of a quasi-instant combustion in the whole combustion chamber volume). It is further advantageous that the combustion rate can be directly influenced by the choice of combustion parameters (distance from the spontaneous ignition limit, excess air, temperature level etc). A disadvantageous, too quick combustion can thus be prevented and the combustion process always takes place in a controlled way.

The laser energy required for the ignition can be decreased by reducing the distance from the spontaneous ignition temperature. In an advantageous version of the invention it is for example provided that the temperature (in Kelvin, K) of the fuel/air mixture in the combustion chamber can be brought at least to over roughly 65% of the spontaneous ignition temperature (in Kelvin, K) of the fuel/air mixture. It can be further provided that the temperature (K) of the fuel/air mixture in the combustion chamber can be brought to at most roughly 98% of the spontaneous ignition temperature (K) of the fuel/air mixture.

In a further advantageous version of the invention it is provided that the air/fuel ratio $\lambda$ is greater than 1.5— preferably greater than 1.8. By using such an extremely lean fuel/air mixture, the emission of pollutants (above all nitrogen oxides $NO_x$) is still further reduced. It can be further provided that the fuel/air mixture in the combustion chamber is homogeneous at least in parts. This means for example that the air/fuel ratio $\lambda$ in the whole combustion chamber is approximately constant. Or that the air/fuel ratio $\lambda$ is smaller in an area around the source of ignition than in the remainder of the combustion chamber and the mixture is thus richer around the source of ignition.

The formation of the—preferably homogeneous—fuel/air mixture can take place, in a further advantageous version of the invention, outside the combustion chamber, for example in an antechamber, or, in another advantageous version of the invention, take place in the combustion chamber, preferably during the induction stroke.

A particularly high thermodynamic efficiency results if the geometric compression ratio s is greater than 14—preferably greater than 16.

In a further advantageous version of the invention it is provided that the combustion engine has at least one laser light source, at least one optical transmission apparatus and at least one coupling optic for focussing the laser light into the combustion chamber, onto at least one focus. By using a single laser light source for the whole combustion engine and the optical transmission of the laser light to the individual cylinders, the laser light source can be positioned at a suitable position in the combustion engine, protected against shaking and dirt. By using holographic-optical elements for focussing the laser light in the combustion chamber, a large number of fire points can also be produced in the combustion chamber with a single laser light beam.

In a further advantageous version of the invention it is provided that each cylinder has an antechamber-less main combustion chamber with in- and outlet valves and at least one focus of the laser light in the main combustion chamber.

In a further advantageous version of the invention it is provided that the laser light source has a preferably diode laser-pumped solid-state laser, a Yb laser and/or Nd laser—preferably a Nd laser with $G^{4+}$ saturable absorber—and/or a Nd/YAG laser being preferred as solid-state laser. The use of these relatively low-cost lasers is made possible because the ignition energy of the fuel/air mixture, already brought close to the spontaneous ignition limit, is only roughly 1 to 30 mJ. Thereby it is even immediately possible, in a further advantageous version of the invention, to use laser diodes as laser light sources for the ignition laser pulse.

The generation of ultra-short laser pulses with a high energy density is achieved in a further advantageous version of the invention through the use of an actively or passively Q-switched laser.

In a further advantageous version of the invention it is provided that the pulse duration of a laser light pulse lies between 1 ns and 100 ns, preferably between 5 ns and 50 ns. Furthermore it can be provided in an advantageous version of the invention that the wavelength of the laser light lies above 400 nm, preferably above 1000 nm. In a further advantageous version of the invention it is provided that the coupling optic has a combustion chamber window—preferably made of sapphire—and outside the combustion chamber a lens or a lens arrangement for focussing the laser light through the combustion chamber window into the combustion chamber. To reduce the number of optical components it can be provided in a further advantageous version of the invention that the combustion chamber window of the coupling optic is itself developed as a lens.

In a further advantageous version of the invention it is provided that an electronic engine-control or engine-regulating device is provided, which, according to recorded engine parameters—preferably the crankshaft angle ($\alpha$) and/or the speed (n) and/or the engine power (N) and/or the current cylinder pressure ($P_z$) in the combustion chamber—triggers the laser light source(s) and in so doing establishes laser light parameters such as the chronological sequence and/or the pulse duration and/or the ignition energy. This makes possible an optimum regulation or control of the combustion engine during operation.

It can also be provided to use two or more ignition pulses per working cycle to ignite the fuel/air mixture, an electronic engine-control or engine-regulating device advantageously being provided which controls or regulates the ignition energy of a second and/or any further laser light pulses during the same working cycle of a cylinder, according to current cylinder pressure after the first laser light pulse. The cylinder pressure pattern can be used to easily establish whether the first laser pulse has already led to ignition. If this was the case, the second and any further laser pulses can remain at a lower standard level, whereas, if the first laser pulse has not led to ignition and a smaller cylinder pressure increase has resulted therefrom, the second laser pulse can be increased in its intensity and optionally in its duration in order to achieve a certain ignition during this working cycle.

Through the possible operation of the combustion engine according to the invention close to the spontaneous ignition limit of the homogeneous fuel/air mixture, the use of any desired combustion fuel is possible (multifuel engine). It can be provided for example during the starting process initially to introduce the ignition process with the highest ignition energies available in order to obtain a certain combustion. It is advantageous to start with a lean fuel/air mixture and, if there is no ignition to enrich the gas mixture of the next cylinder to be influenced, until the engine has successfully completed the start. As the engine continues its run-up, the air/fuel ratio $\lambda$ can be increased and the ignition energy progressively reduced. As the spontaneous ignition limit of the fuel/air mixture used depends in known manner on its temperature and the mixture ratio $\lambda$, the introduction of the ignition process can take place in a further ignition window by varying these values, according to the fuel used.

Combustion residues which have settled on the combustion chamber window can be evaporated by a high-energy laser light pulse. This must, of course, not happen when the combustion chamber is filled with fuel/air mixture (empty). This cleaning process can take place with every working cycle, but also in each case after a pre-determined number of working cycles or with each starting process of the internal combustion engine.

To carry out this process, it can advantageously be provided that an electronic engine-control or engine-regulating device is provided which establishes the air/fuel ratio $\lambda$ at the start of a working cycle, according to recorded engine parameters—preferably on the cylinder pressure—of the previous or the directly preceding working cycles.

In a further advantageous version of the invention it is provided that the geometric compression ratio $\epsilon$ can be varied—preferably through an alternating piston, preferably with hydraulic regulation.

When using such an alternating piston, which can be hydraulically regulated, an additional volume is expediently changed in the centre of the cylinder head in order to vary the compression ratio $\epsilon$. As an alternative or addition, this variation can also be carried out by swivelling the crankshaft or by a variable, preferably pressure-dependent changing of the distance between the middle of the piston pin and the upper edge of the piston.

The internal combustion engine according to the invention is equally suitable for operation as a stationary or mobile engine.

BRIEF DESCRIPTION OF THE DRAWINGS

Further advantages and details of the invention result from the following description of the figures. There are shown in.

DETAILED DESCRIPTION

Figure 1:
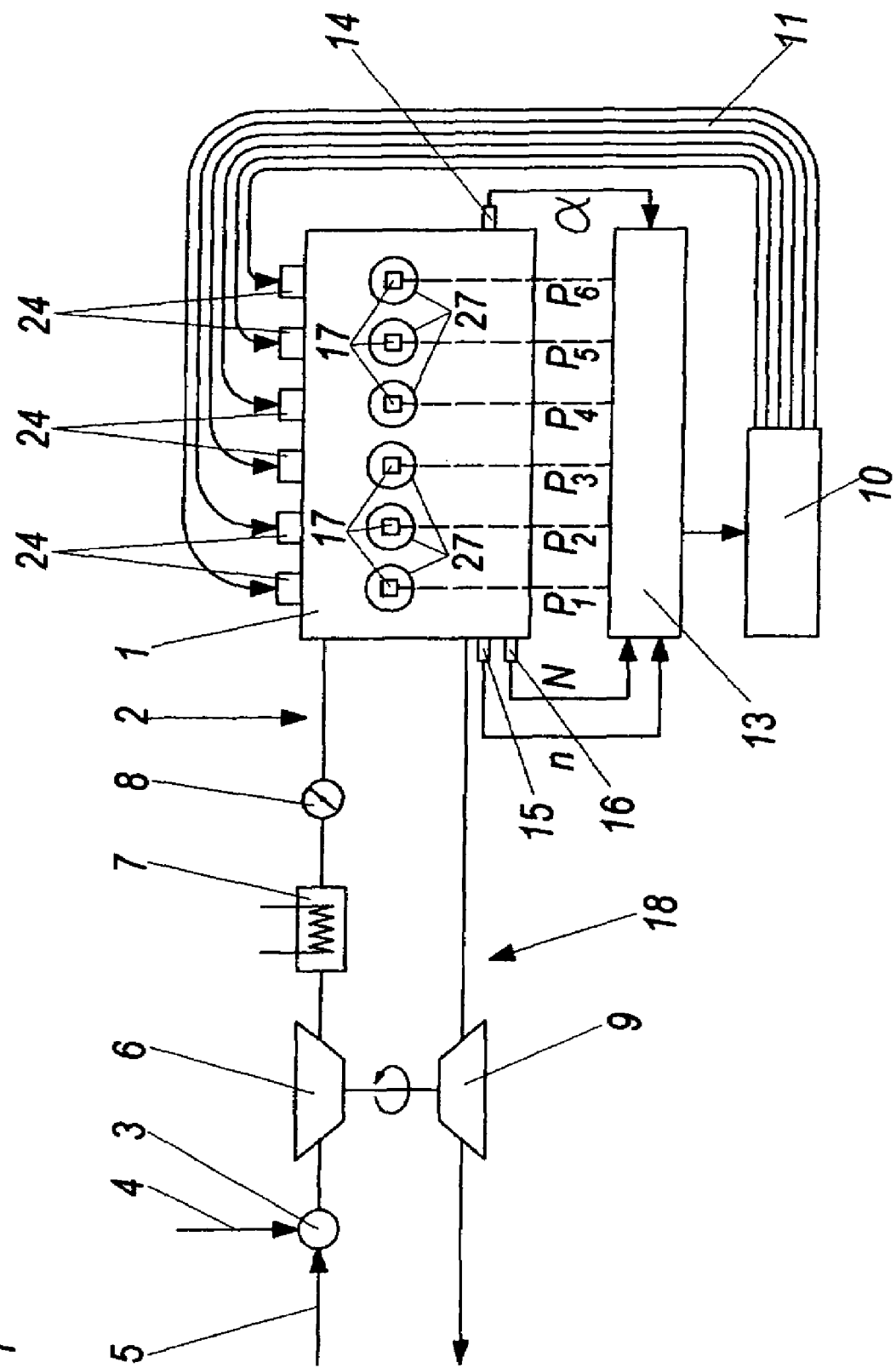
FIG. 1 a diagram of an embodiment of an internal combustion engine according to the invention, FIG. 2 an embodiment of a cylinder of an internal combustion engine according to the invention in a schematic longitudinal section, FIG. 3 a further embodiment of a cylinder of an internal combustion engine according to the invention in a schematic longitudinal section, FIG. 4a, b a further embodiment of a cylinder of an internal combustion engine according to the invention in a schematic longitudinal section and in a top view of the cylinder head, FIG. 5 a further embodiment of a cylinder of an internal combustion engine according to the invention in a schematic longitudinal section and FIG. 6 the timed-related pattern of the laser light intensity during a regulated triple ignition per working cycle.

FIG. 1 shows an internal combustion engine according to the invention with six cylinders 27 in a stationary version. The fuel/air mixture is fed to the cylinder block 1 via an inlet line 2 and removed via the exhaust line 18. In a mixer 3, fuel fed via the pipe 4 is mixed with air fed via the pipe 5. The fuel/air mixture is compressed via the turbocharger compressor 6 and passes via the thermal element 7, via which the temperature (in Kelvin, K) of the fuel/air mixture can be changed, and the throttle valve 8 into the space before the inlet valves, not represented in more detail, of the cylinder block 1. The turbine wheel 9 of the turbocharger is arranged in the exhaust line 18. The mixture formation could of course also take place inside the cylinder head in the suction line or in the cylinder space directly during the induction stroke.

Also to be seen are a laser light source designated 10 and an optical transmission apparatus, consisting of flexible optical conductors 11, which guide the laser light to the coupling optics 24 of the individual cylinders.

The laser light source 10 is regulated by an electronic engine-regulating device 13 which receives the current operational values of the engine from the schematically represented measurement apparatus for speed 15, engine power 16 and cylinder pressure 17. The current crank angle value is designated $\alpha$, the engine power N, the speed n and the current cylinder pressure values P1 to P6. The crank shaft angle signal $\alpha$ serves above all to fix the times of the laser ignition pulses to the individual cylinders 27.

It would naturally also be possible for each individual cylinder 27 to be provided with its own laser in the laser light source 10.

Figure 2:
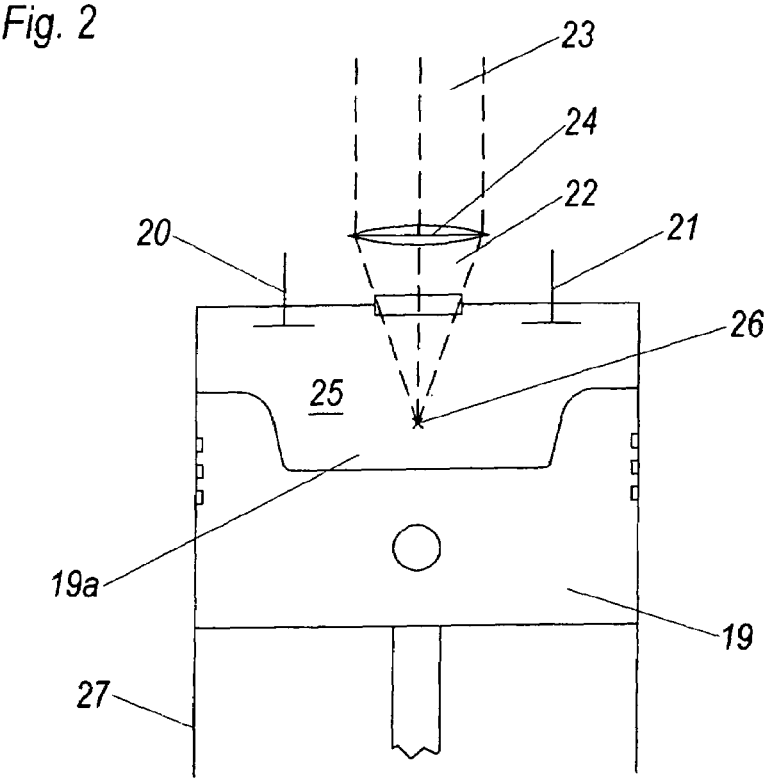

FIG. 2 shows an embodiment of a cylinder 27 of an internal combustion engine according to the invention in a schematic longitudinal section. The piston 19, which has a piston trough 19a, is represented in the top dead centre point. The inlet valve 20 and the outlet valve 21 are only schematically represented. It is provided in this embodiment to focus the laser light 23 coming from the laser light source 10 through a lens 24 via a combustion chamber window 22 on an individual fire point 26 in the combustion chamber 25. This representation is naturally not to scale, especially also as regards the geometric compression ratio c. This also applies to all the other figures.

Figure 3:
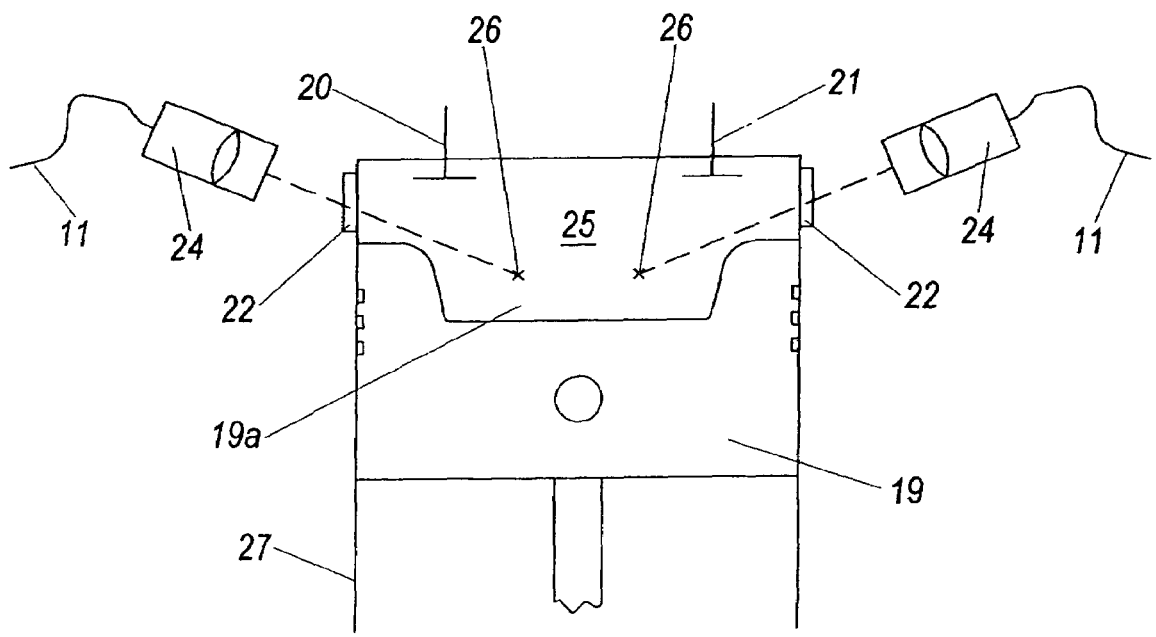

FIG. 3 shows a further embodiment of a cylinder 27 of an internal combustion engine according to the invention, in which the laser light 23 is focussed via two coupling optics 24 and two combustion chamber windows 22 on two fire points 26 in the combustion chamber 25. The laser light 23 supplied via the optical conductors 11 can come from the same laser light source or the same laser. It is however also possible to use separate lasers. It could equally be provided to use these two laser light pulses in time-shifted manner for ignition during one and the same working cycle or for the introduction of same.

Figure 4A:
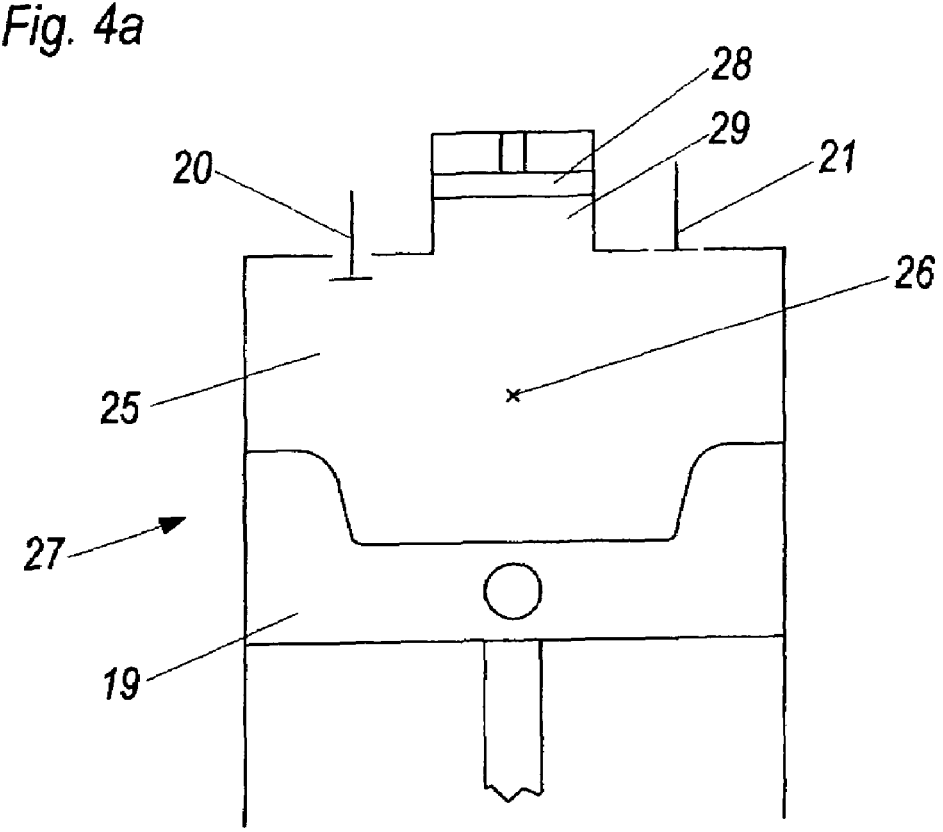
Figure 4B:
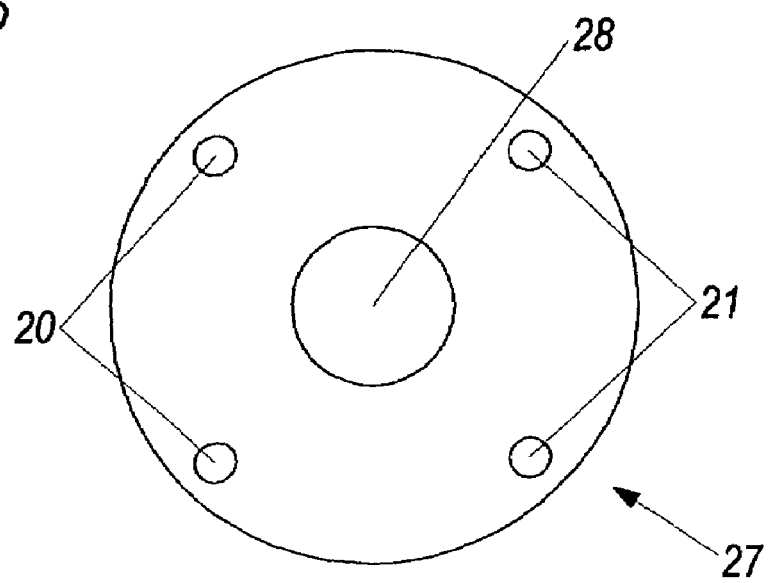

FIG. 4a shows a further embodiment of a cylinder 27 of an internal combustion engine according to the invention, in which a hydraulically operated alternating piston 28 is provided for a variation of the geometric compression ratio $\epsilon$. By setting the regulation volume 29 via the movement of the alternating piston 28 the volume of the combustion chamber 25 connected to the regulation volume 29 can be reduced or increased. In this example the laser light 23 is introduced through a combustion chamber window 22, not shown, arranged in the cylinder side wall. FIG. 4b shows a top view of the cylinder head of FIG. 4a with pistons 19 removed. The alternating piston 28 and two of each inlet and outlet valves 20, 21 are to be recognized.

Figure 5:
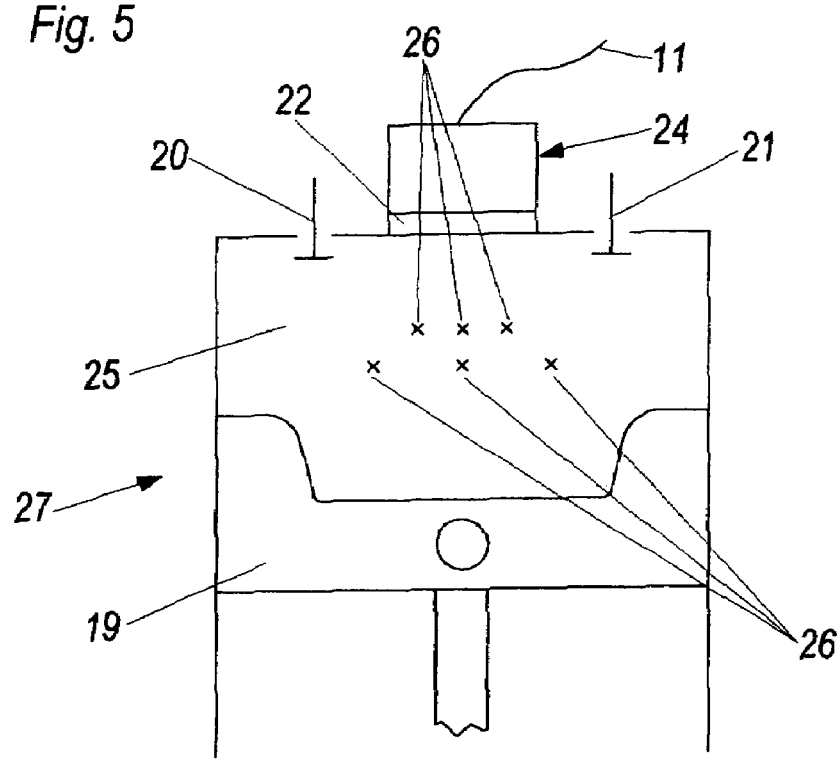

FIG. 5 shows a further embodiment of a cylinder 27 of an internal combustion engine according to the invention, in which six fire points 26 are provided in the combustion chamber 25. The creation of these fire points 26 can take place via a holographic, optical element (for example a diffraction grid), not shown in more detail, in the coupling optic 24.

Figure 6:
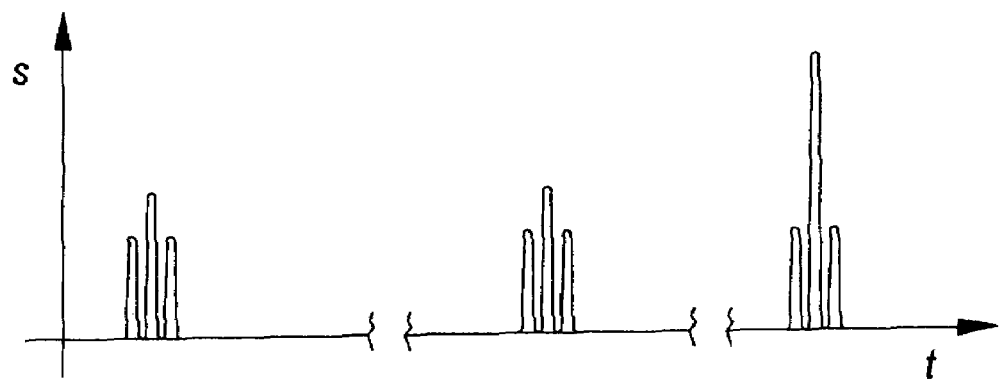

FIG. 6 shows a chronological sequence of laser ignition pulses for ignition or introduction of successive working cycles, three laser light pulses of different intensities in close chronological succession per ignition process being provided in this embodiment. A reliable ignition can thereby also be achieved with very lean fuel/air mixtures. In addition such a multiple ignition allows a real-time regulation of the laser light intensity via the cylinder pressure. It can be provided for example that the intensity of the second laser light pulse is increased if the first laser light pulse has not led to ignition, which can be recognized from a too flat an increase in the measured cylinder pressure. This is shown in FIG. 6 for example in the case of the third ignition pulse group (far right). The representation and description of components or handling procedures which are known to a person skilled in the art have been dispensed with.

The invention claimed is:

1. An internal combustion engine comprising at least one cylinder with a combustion chamber, in which a fuel/air mixture can be compressed by a piston, wherein a temperature in Kelvin of the fuel/air mixture in the combustion chamber can be set to at least over 80% and up to at most 98% of a spontaneous ignition temperature in Kelvin and with that to a temperature in Kelvin different from the spontaneous ignition temperature in Kelvin of the fuel/air mixture and an ignition of the combustion is time-controlled through an introduction of laser light into the combustion chamber.

2. The internal combustion engine according to claim 1, wherein the temperature in Kelvin of the fuel/air mixture in the combustion chamber can be set to at least over 85%, preferably over 87%, of the spontaneous ignition temperature in Kelvin of the fuel/air mixture.

3. The internal combustion engine according to claim 1, wherein the temperature in Kelvin of the fuel/air mixture in the combustion chamber can be set to at most 95%, preferably at most 93%, of the spontaneous ignition temperature in Kelvin of the fuel/air mixture.

4. The internal combustion engine according to claim 1, wherein the fuel/air mixture is formed outside the combustion chamber.

5. The internal combustion engine according to claim 1, wherein the fuel/air mixture is formed in the combustion chamber.

6. The internal combustion engine according to claim 1, wherein the fuel/air mixture is formed during the induction stroke.

7. The internal combustion engine according to claim 1, wherein the fuel/air mixture in the combustion chamber is at least in parts homogeneous.

8. The internal combustion engine according to claim 7, wherein an air/fuel ratio in the whole combustion chamber is approximately constant.

9. The internal combustion engine according to claim 7, wherein an air/fuel ratio is smaller in an area around the source of ignition than in the remainder of the combustion chamber.

10. The internal combustion engine according to claim 1, wherein an air/fuel ratio is greater than 1.5.

11. The internal combustion engine according to claim 1, wherein an air/fuel ratio is greater than 1.8.

12. The internal combustion engine according claim 1, wherein a geometric compression ratio is greater than 14.

13. The internal combustion engine according to claim 1, wherein a geometric compression ratio is greater than 16.

14. The internal combustion engine according to claim 1, further comprising at least one laser light source, at least one optical transmission apparatus and at least one coupling optic for focusing of the laser light into the combustion chamber, onto at least one focus.

15. The internal combustion engine according to claim 1 further comprising a plurality of cylinders, wherein each cylinder has an antechamber-less main combustion chamber with in- and outlet valves and at least one focus of the laser light lies in the main combustion chamber.

16. The internal combustion engine according to claim 1, wherein the engine comprises a stationary engine.

17. The internal combustion engine according to claim 1, wherein a laser light source has a solid-state laser.

18. The internal combustion engine according to claim 17, wherein the solid-state laser is diode laser-pumped.

19. The internal combustion engine according to claim 17, wherein the solid-state laser is selected from the group consisting of a Yb laser, a Nd laser and a Nd/YAG laser.

20. The internal combustion engine according to claim 1, wherein a laser light source comprises at least one laser diode the light of which enters the combustion chamber via an optical conductor and a coupling optic.

21. The internal combustion engine according to claim 20, wherein the optical conductor is flexible.

22. The internal combustion engine according to claim 1, wherein a laser light source is selected from the group consisting of an actively and a passively Q switched laser.

23. The internal combustion engine according to claim 1, wherein a wavelength of the laser light lies above 400 nm.

24. The internal combustion engine according to claim 1, wherein a wavelength of the laser light lies above 1000 nm.

25. The internal combustion engine according to claim 1, wherein the laser light produces a laser light pulse wherein a pulse duration of the laser light pulse lies between 1 ns and 100 ns.

26. The internal combustion engine according to claim 1, wherein the laser light produces a laser light pulse wherein a pulse duration of the laser light pulse lies between 5 ns and 50 ns.

27. The internal combustion engine according to claim 1, further comprising a coupling optic having a combustion chamber window and outside the combustion chamber a lens or a lens arrangement for focusing the laser light through the combustion chamber window into the combustion chamber.

28. The internal combustion engine according to claim 27, wherein the combustion chamber window of the coupling optic is made of sapphire.

29. The internal combustion engine according to claim 27, wherein the combustion chamber window of the coupling optic comprises a lens.

30. The internal combustion engine according to claim 1, further comprising an electronic engine-control or an engine-regulating device which, according to recorded engine parameters, is operable to trigger at least one laser light source and in so doing establishes laser light parameters.

31. The internal combustion engine according to claim 30, wherein the recorded engine parameters are at least one selected from the group consisting of a crankshaft angle, a speed, an engine power and a current cylinder pressure in the combustion chamber.

32. The internal combustion engine according to claim 30, wherein the laser light parameters are at least one selected from the group consisting of a chronological sequence, a pulse duration and an ignition energy.

33. The internal combustion engine according to claim 1, further comprising an electronic engine-control or an engine-regulating device which, at the start of a working cycle, is operable to establish the air/fuel ratio according to recorded engine parameters of a directly preceding working cycle.

34. The internal combustion engine according to claim 33, wherein the recorded engine parameters are the cylinder pressures.

35. The internal combustion engine according to claim 1, wherein a geometric compression ratio can be varied.

36. The internal combustion engine according to claim 35 further comprising an alternating piston, wherein the geometric compression ratio can be varied by the alternating piston.

37. The internal combustion engine according to claim 35 further comprising a crankshaft, wherein the geometric compression ratio can be varied by swivelling the crankshaft.

38. The internal combustion engine according to claim 35 further comprising a piston pin, wherein the geometric compression ratio can be varied by changing a distance between a middle of the piston pin and an upper edge of the piston.

39. The internal combustion engine according to claim 35 further comprising a piston pin, wherein the geometric compression ratio can be varied by a pressure-dependent changing of a distance between a middle of the piston pin and an upper edge of the piston.

40. The internal combustion engine according to claim 1, wherein, after a pre-determined number of working cycles, a laser light pulse is emitted into the combustion chamber which is not filled with fuel/air mixture.

41. The internal combustion engine according to claim 1, wherein during a starting process of the internal combustion engine, a laser light pulse is emitted into the combustion chamber which is not filled with the fuel/air mixture.

* * * * *